United States Patent
Yu et al.

(10) Patent No.: US 10,826,649 B1
(45) Date of Patent: Nov. 3, 2020

(54) WIFI RECEIVER ARCHITECTURE

(71) Applicant: Marvell International Ltd., Hamilton (BM)

(72) Inventors: Mao Yu, San Jose, CA (US); Yong Ma, San Jose, CA (US); Chao Shan, Milpitas, CA (US); Yan Zhong, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 94 days.

(21) Appl. No.: 16/261,293

(22) Filed: Jan. 29, 2019

Related U.S. Application Data

(60) Provisional application No. 62/782,177, filed on Dec. 19, 2018.

(51) Int. Cl.
| | | |
|---|---|---|
| *H04L 1/00* | (2006.01) | |
| *H04L 25/03* | (2006.01) | |
| *H04W 28/02* | (2009.01) | |

(52) U.S. Cl.
CPC .......... *H04L 1/0045* (2013.01); *H04L 1/0058* (2013.01); *H04L 1/0061* (2013.01); *H04L 25/03057* (2013.01); *H04W 28/0278* (2013.01)

(58) Field of Classification Search
None
See application file for complete search history.

(56) References Cited

U.S. PATENT DOCUMENTS

| | | | |
|---|---|---|---|
| 7,336,727 | B2 | 2/2008 | Mukkavilli et al. |
| 8,081,692 | B1 | 12/2011 | Zhang et al. |
| 9,106,295 | B1 | 8/2015 | Zhang et al. |
| 2004/0165684 | A1 | 8/2004 | Ketchum et al. |
| 2005/0259760 | A1* | 11/2005 | Casabona .............. H04K 3/228 375/260 |
| 2006/0045193 | A1 | 3/2006 | Stolpman et al. |
| 2007/0053460 | A1 | 3/2007 | Ashikhmin |
| 2007/0129018 | A1 | 6/2007 | Trainin et al. |
| 2007/0206626 | A1 | 9/2007 | Lee et al. |
| 2007/0226287 | A1 | 9/2007 | Lin et al. |
| 2007/0230373 | A1 | 10/2007 | Li et al. |

(Continued)

OTHER PUBLICATIONS

W.W.K. Lim, A.K.Y. Wong, T.S. Dillon, Application of soft computing techniques to adaptive user buffer overflow control on the Internet, May 2006, IEEE, IEEE Transactions on Systems, Man, and Cybernetics, Part C (Applications and Reviews), vol. 36, Issue 3, pp. 397-410 (Year: 2006).*

(Continued)

*Primary Examiner* — Albert Decady
*Assistant Examiner* — Jonathan Chang

(57) ABSTRACT

A communication device determines that a data rate of a data packet exceeds a threshold, and in response, lowers a processing speed of an equalizer device to prevent a buffer from overflowing. The buffer stores outputs generated by the equalizer device. A forward error correction code decoder device of the communication device processes outputs of the equalizer device corresponding to the data packet to generate decoded information corresponding to the data packet. The communication device transmits an acknowledgment packet to acknowledge the data packet such that transmission of the acknowledgment packet begins within required time period, defined by a communication protocol, after an end of the data packet.

20 Claims, 11 Drawing Sheets

(56) References Cited

U.S. PATENT DOCUMENTS

| | | |
|---|---|---|
| 2007/0258536 A1 | 11/2007 | Kim et al. |
| 2008/0014870 A1* | 1/2008 | Kim ................... H04B 7/0617 |
| | | 455/69 |
| 2008/0045153 A1 | 2/2008 | Surineni et al. |
| 2008/0165875 A1 | 7/2008 | Mundarath et al. |
| 2008/0219376 A1 | 9/2008 | Qi et al. |
| 2009/0080560 A1 | 3/2009 | Na et al. |
| 2009/0129456 A1* | 5/2009 | Miyatani ........... H04L 25/03159 |
| | | 375/232 |
| 2009/0158109 A1 | 6/2009 | Park et al. |
| 2017/0188056 A1* | 6/2017 | Do ....................... H04L 1/0014 |
| 2018/0115921 A1* | 4/2018 | Chen ..................... H04W 28/12 |

OTHER PUBLICATIONS

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

* cited by examiner

WIFI RECEIVER ARCHITECTURE

CROSS REFERENCES TO RELATED APPLICATIONS

This application claims the benefit of U.S. Provisional Patent Application No. 62/782,177, entitled "Architecture of Receiver for Wireless Networks," filed on Dec. 19, 2018, the disclosure of which is hereby expressly incorporated herein by reference in its entirety.

FIELD OF TECHNOLOGY

The present disclosure relates generally to wireless communication systems, and more particularly to a wireless local area network (WLAN) receiver architecture.

BACKGROUND

Wireless local area networks (WLANs) have evolved rapidly over the past decade, and development of WLAN standards such as the institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method includes: determining, at a communication device, that a data rate of a data packet exceeds a threshold; in response to determining that the data rate exceeds the threshold, lowering a processing speed of an equalizer device of the communication device to prevent a buffer from overflowing, wherein the buffer stores outputs generated by the equalizer device; processing, by a forward error correction code decoder device of the communication device, outputs of the equalizer device corresponding to the data packet to generate decoded information corresponding to the data packet; and transmitting, by the communication device, an acknowledgment packet to acknowledge the data packet, wherein transmission of the acknowledgment packet begins within a required time period after an end of the data packet, wherein the required time period is defined by a communication protocol.

In another embodiment, an apparatus comprises: a network interface device associated with a communication device. The network interface device includes one or more integrated circuits (ICs) configured to: determine that a data rate of a data packet exceeds a threshold; in response to determining that the data rate exceeds the threshold, lower a processing speed of an equalizer device of the communication device to prevent a buffer from overflowing, wherein the buffer stores outputs generated by the equalizer device; process, using a forward error correction code decoder device of the communication device, outputs of the equalizer device corresponding to the data packet to generate decoded information corresponding to the data packet; and transmit an acknowledgment packet to acknowledge the data packet, wherein transmission of the acknowledgment packet begins within a required time period after an end of the data packet, wherein the required time period is defined by a communication protocol.

In yet another embodiment, a method includes: transmitting, by a first communication device, information to a second communication device informing the second communication device that packets intended for the first communication device and that use a particular modulation and coding scheme (MCS) must include a packet extension field; receiving, at the first communication device, a data packet from the second communication device, wherein the data packet is transmitted using the particular MCS, and wherein data packet includes a packet extension field at an end of the data packet; in response to determining that the data packet is transmitted using the particular MCS, setting a processing speed of an equalizer device of the first communication device to a speed that is less than a maximum processing speed of the equalizer device to prevent a buffer from overflowing, wherein the buffer receives outputs generated by the equalizer device; processing, by a forward error correction code decoder device, outputs of the equalizer device corresponding to the data packet to generate decoded information corresponding to the data packet, wherein at least a subset of the outputs of the equalizer device are processed during the packet extension field; and transmitting, by the communication device, an acknowledgment packet to acknowledge the data packet, wherein transmission of the acknowledgment packet begins within a required time period after an end of reception of the data packet, wherein the required time period is defined by a communication protocol.

In still another embodiment, an apparatus comprises: a network interface device associated with a communication device. The network interface device includes one or more ICs configured to: transmit information to a second communication device informing the second communication device that packets intended for the first communication device and that use a particular modulation and coding scheme (MCS) must include a packet extension field; receive a data packet from the second communication device, wherein the data packet is transmitted using the particular MCS, and wherein data packet includes a packet extension field at an end of the data packet; in response to determining that the data packet is transmitted using the particular MCS, set a processing speed of an equalizer device of the first communication device to a speed that is less than a maximum processing speed of the equalizer device to prevent a buffer from overflowing, wherein the buffer receives outputs generated by the equalizer device; process, using a forward error correction code decoder device, outputs of the equalizer device corresponding to the data packet to generate decoded information corresponding to the data packet, wherein at least a subset of the outputs of the equalizer device are processed during the packet extension field; and transmit an acknowledgment packet to acknowledge the data packet, wherein transmission of the acknowledgment packet begins within a required time period after an end of the data packet, wherein the required time period is defined by a communication protocol.

DETAILED DESCRIPTION

Embodiments of wireless receiver architectures are discussed below in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, similar wireless receiver architectures are utilized in other types of wireless communication systems such as personal area networks (PANs), mobile communication networks such as cellular networks, metropolitan area networks (MANs), satellite communication networks, etc.

In a wireless receiver, different components may be capable of processing a received signal/data at different speeds outputs of a faster component need to be buffered so that a slower component is able to process the outputs of the faster component, but adding memory for buffering to the wireless receiver increases the cost of the wireless receiver. Alternatively, increasing the speed of the slower component also increases the cost of the wireless receiver. In various embodiments described below, a wireless receiver architecture reduces the amount of memory required for buffering (which reduces the cost of the wireless receiver) by, for example, slowing down the processing rate of a fast component of the wireless receiver for certain high received data rate(s) so that the amount of outputs of the fast component that need to be buffered for a slower component is reduced.

Figure 1:
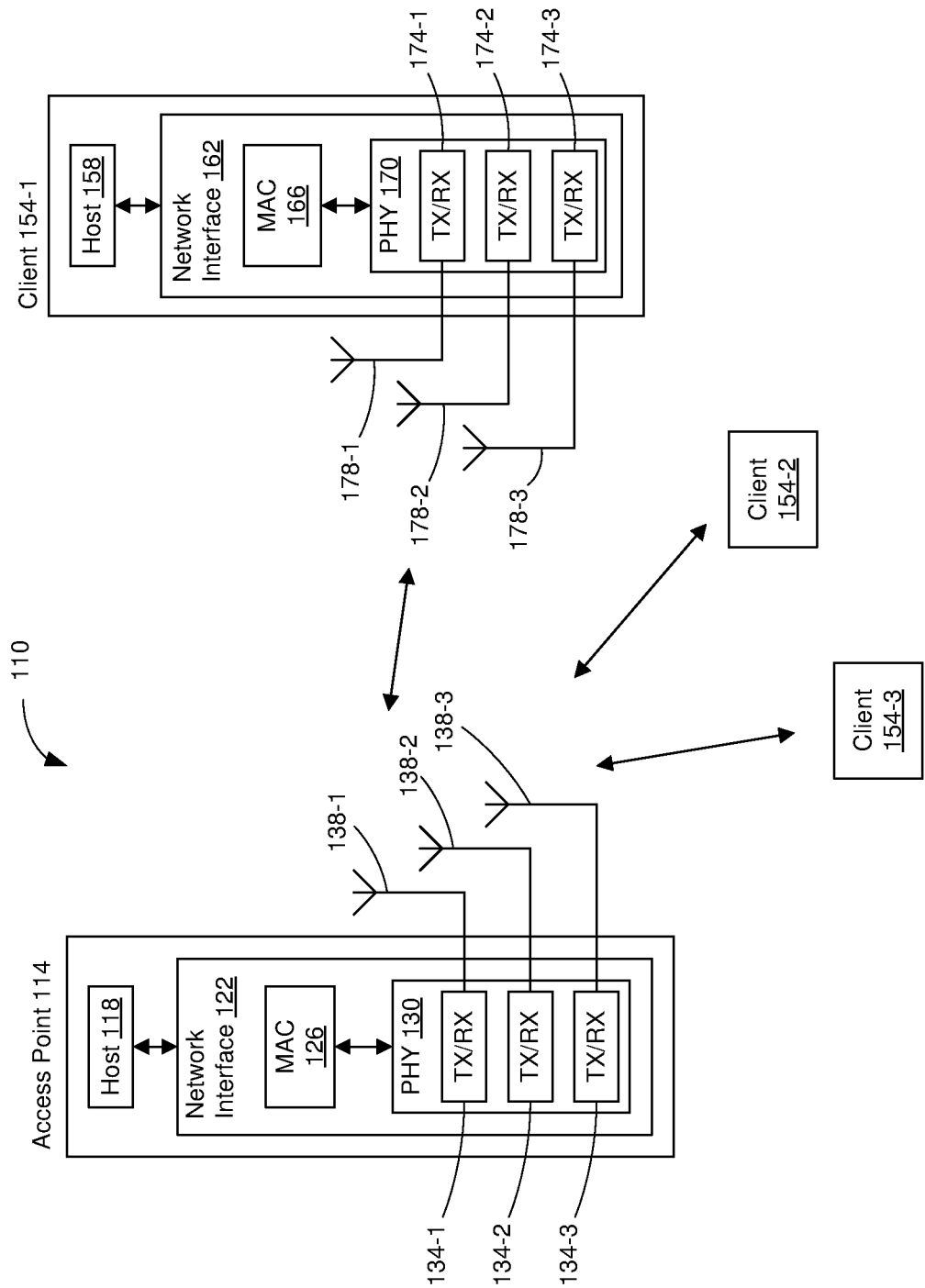
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130, The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PPDUs (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 additionally or alternatively includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 1544 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 1544 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a. ROM, a flash memory, etc. In an embodiment, the MAC processor 166 additionally or alternatively includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
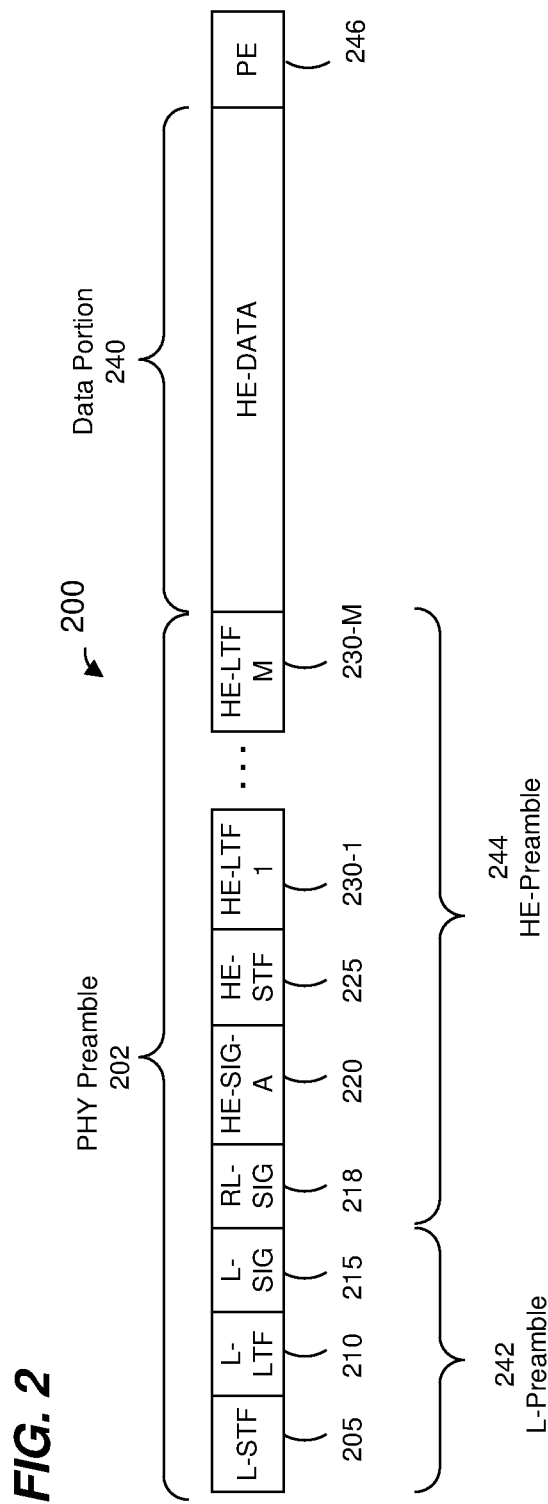
FIG. 2 is a block diagram of an example physical layer (PRY) protocol data unit, according to an embodiment.

FIG. 2 is a diagram of an example PPDU 200 that the network interface 122 (FIG. 1) is configured to generate and transmit to one client station 154 (e.g., the client station 154-1), according to an embodiment. The network interface 162 (FIG. 1) may also be configured to transmit PPDUs the same as or similar to the PPDU 200 to the AP 114. The PPDU 200 may occupy a 20 MHz bandwidth or another suitable bandwidth. Data units similar to the data unit 200 occupy other suitable bandwidth such as 40 MHz, 80 MHz, 160 MHz, 320 MHz, 640 MHz, for example, or other suitable bandwidths, in other embodiments.

The PPDU 200 includes a PHY preamble 202 including a legacy short training field (L-STF) 205, a legacy long training field (L-LTF) 210, a legacy signal field (L-SIG) 215, a repeated L-SIG field (RL-SIG) 218, a high efficiency (HE) signal field (HE-SIG-A) 220, an HE short training field (HE-SIT) 225, and M HE long training fields (HE-LTFs) 230, where M is a suitable positive integer. In an embodiment, M generally corresponds to (e.g., is greater than or equal to) a number of spatial streams via which the PPDU 200 will be transmitted. A legacy preamble (L-preamble) 242 of the PHY preamble 202 includes the L-STF 205, L-LTF 210 and L-SIG 215. An HE preamble portion 244 of the PHY preamble 202 includes the RL-SIG 218, the HE-SIG-A 220, the HE-STF 225 and the M HE-LTFs 230. The PPDU 200 also includes a PHY data portion 240. In some scenarios, the PPDU 200 may omit the PHY data portion 240. The PPDU 200 may also optionally include a packet extension (PE) field 246 with arbitrary data to provide additional processing time, for processing the PPDU 200, to a receiver of the PPDU 200.

In an embodiment, the L-SIT 205 includes a signal that is configured to permit a wireless receiver to perform one or more functions such as i) packet detection, ii) initial synchronization, and iii) AGC adjustment. In an embodiment, the L-LTF 210 includes a signal that is configured to permit the wireless receiver to perform one or more functions such as i) channel estimation and ii) fine synchronization. In an embodiment, the HE-STF 225 includes a signal that is configured to permit the wireless receiver to perform a function such as AGC refinement. In an embodiment, the HE-LTFs 230 includes signals that are configured to permit the wireless receiver to perform a function such as channel estimation for a multiple input, multiple output (MIMO) channel that employs multiple spatial streams.

In an embodiment, the HE-SIG-A 220 generally carries information about the format of the packet (e.g., a PPDU) 200, such as information needed to properly decode at least a portion of the packet 200, in an embodiment. In some embodiments, HE-SIG-A 220 additionally includes information for receivers that are not intended receivers of the packet 200, such as information needed for medium protection, spatial reuse, etc. In an embodiment, the HE-SIG-A 220 includes information that indicates a data rate that is used in the PHY data portion 240. For example, in an embodiment, the HE-SIG-A 220 includes a subfield that indicates a modulation and coding scheme (MCS) that is used in the PHY data portion 240. In another example, in an embodiment, the HE-SIG-A 220 includes a subfield that indicates a number of spatial streams used in the PHY data portion 240.

In some embodiments, the PHY preamble 202 omits one or more of the fields 205-230. In some embodiments, the PHY preamble 202 includes additional fields not illustrated in FIG. 2. For instance, in an embodiment, the HE-preamble 244 may include one or more additional signal field(s) to facilitate multi-user MIMO (MU-MIMO) and/or orthogonal frequency division multiple access (OFDMA) transmissions.

Each of the L-STF 205, the L-LTF 210, the L-SIG 215, the RL-SIG 218, the HE-SIG-A 220, the HE-STF 225, and the M HE-LTFs 230 comprises one or more orthogonal frequency division multiplexing (OFDM) symbols. As merely an illustrative example, the HE-SIG-A 220 comprises two OFDM symbols.

In the illustration of FIG. 2, the packet 200 includes one of each of the L-STF 205, the L-LTF 210, the L-SIG 215, the RL-SIG 218 and the HE-SIG-A 220. In some embodiments in which a packet similar to the packet 200 occupies a cumulative bandwidth other than 20 MHz, each of the L-STF 205, the L-LTF 210, the L-SIG 215, the RL-SIG 218, and the HE-SIG-A 220 is repeated over a corresponding number of 20 MHz sub-bands of the whole bandwidth of the packet, in an embodiment. For example, in an embodiment in which the packet 200 occupies an 80 MHz bandwidth, the packet 200 includes four of each of the L-STF 205, the L-LTF 210, the L-SIG 215, the RL-SIG 218, and the HE-SIG-A 220.

Figure 3:
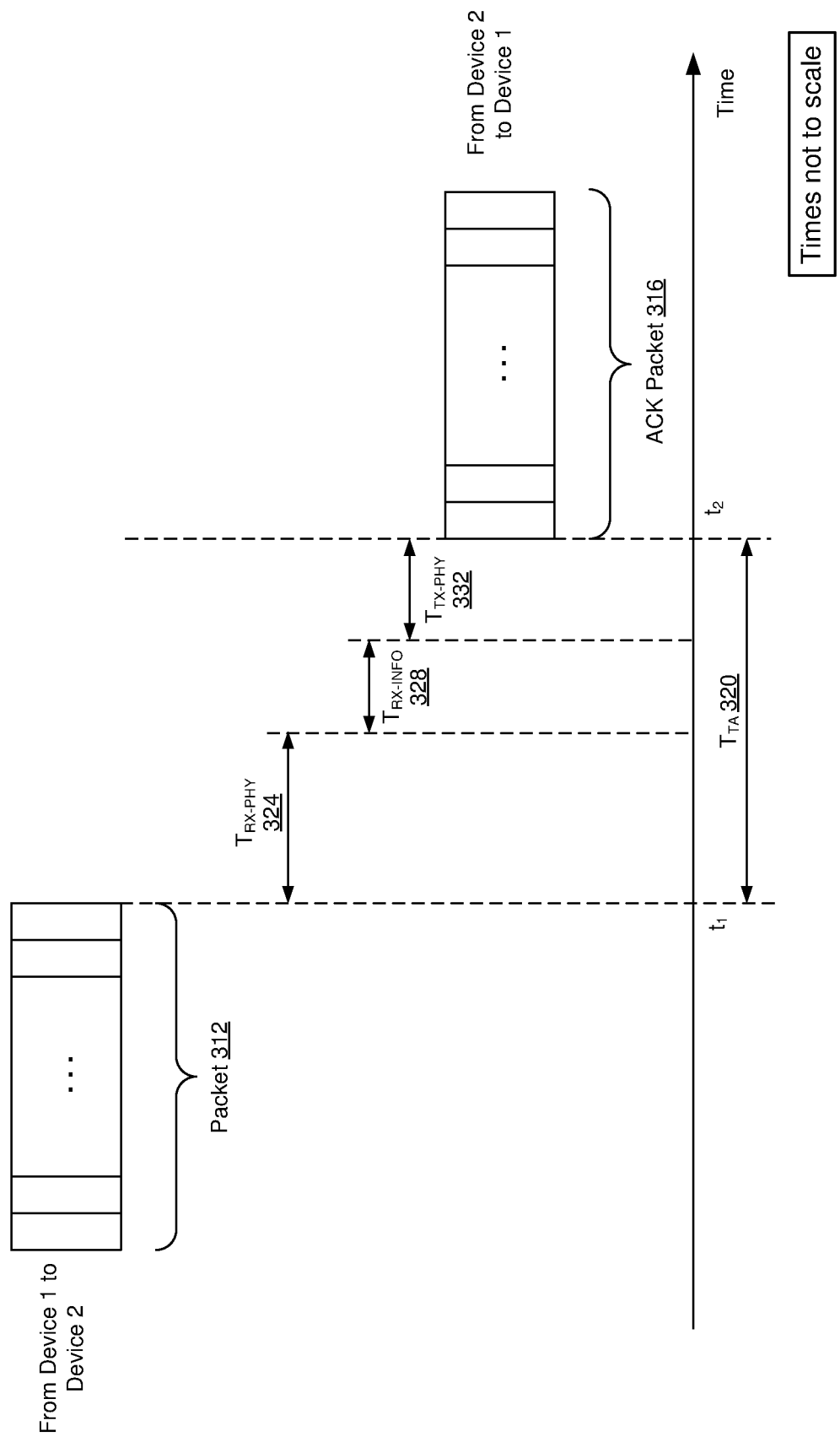
FIG. 3 is a timing diagram of an example packet exchange between two communication devices, according to an embodiment.

FIG. 3 is a timing diagram of an example packet exchange 300 between two devices, according to an embodiment. In an embodiment, device 1 corresponds to the AP 114 and device 2 corresponds the client station 154. In another embodiment, device 1 corresponds to the client station 154 and device 2 corresponds the AP 114, In other embodiments, both device 1 and device 2 correspond to different client stations 154 or different APs 114. The packet exchange 300 is described with reference to FIG. 1 merely for ease of explanation. In other embodiments, however, communication devices different from the communication devices of FIG. 1 participate in the packet exchange 300.

At time $t_1$, device 2 reception of a packet 312 transmitted by device 1 ends. At time $t_2$, and within a time interval equal to a turn-around time ($T_{TA}$) 320, the device 2 begins transmitting an acknowledgment (ACK) packet 316 to the device 1 to acknowledge the reception of packet 312. In various embodiments, the packet 312 and the ACK packet 316 are formatted similar to the PPDU 200, as described above.

During the $T_{TA}$ 320, various operations to process the packet 312 (at device 2) and to generate the ACK packet 316 (at device 2) take place, and correspond to different time periods. During a receive PHY processing time ($T_{RX\text{-}PHY}$) 324, the device 2 performs processing operations corresponding to PHY layer functions corresponding to processing the packet 312, such as demodulation, forward error correction (FEC) decoding, etc. During receive information processing time ($T_{RX\text{-}INFO}$) 328, the device 2 performs processing operations corresponding to various higher layer functions (e.g., MAC layer functions) corresponding to processing the packet 312. During transmit PHY processing time ($T_{TX\text{-}PHY}$) 332, device 2 generates the ACK packet 316.

In an embodiment, certain restrictions may be placed on a duration of the $T_{TA}$ 320 by the WLAN communication protocol. In an embodiment, the $T_{TA}$ 320 is required to be less than or equal to a maximum value, $T_{TA,max}$, set by a communication protocol such as defined by the IEEE 802.11 Standard. For instance, in various embodiments, the $T_{TA}$ 320 is required to be less than or equal to 4 µs, 8 µs, 16 µs, etc. (i.e., $T_{TA,max}$=4 µs, 8 µs, 16 µs, etc., respectively). In other embodiments, the $T_{TA}$ 320 is required to be less than or equal to any other suitable time value.

In an embodiment, information bits that are included in a last (in time of transmission) OFDM symbol of a packet (e.g., a last transmitted OFDM symbol of the PHY data portion 240), where the information bits that do not fill up the last OFDM symbol, are referred to herein as "excess information bits." When generating a packet for transmission, the excess information bits may be subject to one or more padding steps prior to encoding and following encoding. For instance, pre-forward error correction (FEC) coding (pre-FEC) padding bits are added prior to FEC encoding to pad the excess information bits such that, after FEC-encoding, the number of encoded bits occupies an integer number of symbol segments that correspond to the last OFDM symbol. Further, post-FEC padding bits are added following FEC encoding to ensure that the number of bits to be included in the last OFDM symbol is equal to the number of coded bits per OFDM symbol as defined by the WLAN communication protocol, according to an embodiment. Post-FEC padding bits are not decoded at a receiver, according to an embodiment.

In addition to padding bits such as described above, a PE field may be appended to an end of a packet to provide additional processing time to the receiver of the packet. A duration of the PE field may be determined using a factor (referred to herein as an "a-factor") that is calculated based on a number of excess information bits. A larger a-factor generally corresponds to a larger number of excess information bits. In various embodiments, a duration of a PE field is directly proportional to a value of the a-factor. In an embodiment, the a-factor is calculated according to equation 1:

$$a = \begin{cases} 4, & \text{if } N_{Excess} = 0 \\ \min\left(\left\lceil \frac{N_{Excess}}{m_{STBC} \cdot N_{DBPS,SHORT}} \right\rceil, 4\right), & \text{otherwise} \end{cases} \quad \text{Equation 1}$$

where, $m_{STBC}$ is 2 when space-time block coding is used and 1 otherwise, and $$N_{Excess} = \mathrm{mod}(8 \cdot APEP\_LENGTH + N_{tail} + N_{service}, m_{STBC} \cdot N_{DBPS})$$

$$N_{DBPS,SHORT} = N_{CBPS,SHORT} \cdot R$$

$$N_{CBPS,SHORT} = N_{SD,SHORT} \cdot N_{SS} \cdot N_{BPSCS}$$

wherein APEP_LENGTH is a TXVECTOR parameter indicating a number of octets in an MPDU corresponding to the packet, $N_{tail}$ is a number of tail bits in the packet, $N_{service}$ is a number of service bits in the packet, $N_{DBPS}$ is a number of data bits per symbol, $N_{SS}$ is a number of spatial streams, $N_{BPSCS}$ is a number of coded bits per subcarrier per spatial stream, and $N_{SD,SHORT}$ is defined for different resource unit sizes as in Table 1:

TABLE 1

$N_{SD,SHORT}$ values for different RU sizes

| RU size | $N_{SD,SHORT}$ |
|---|---|
| 26-tone | 6 |
| 52-tone | 12 |
| 106-tone | 74 |
| 242-tone | 60 |
| 484-tone | 120 |
| 996-tone | 240 |
| 2 × 996-tone | 492 |

Figure 4:
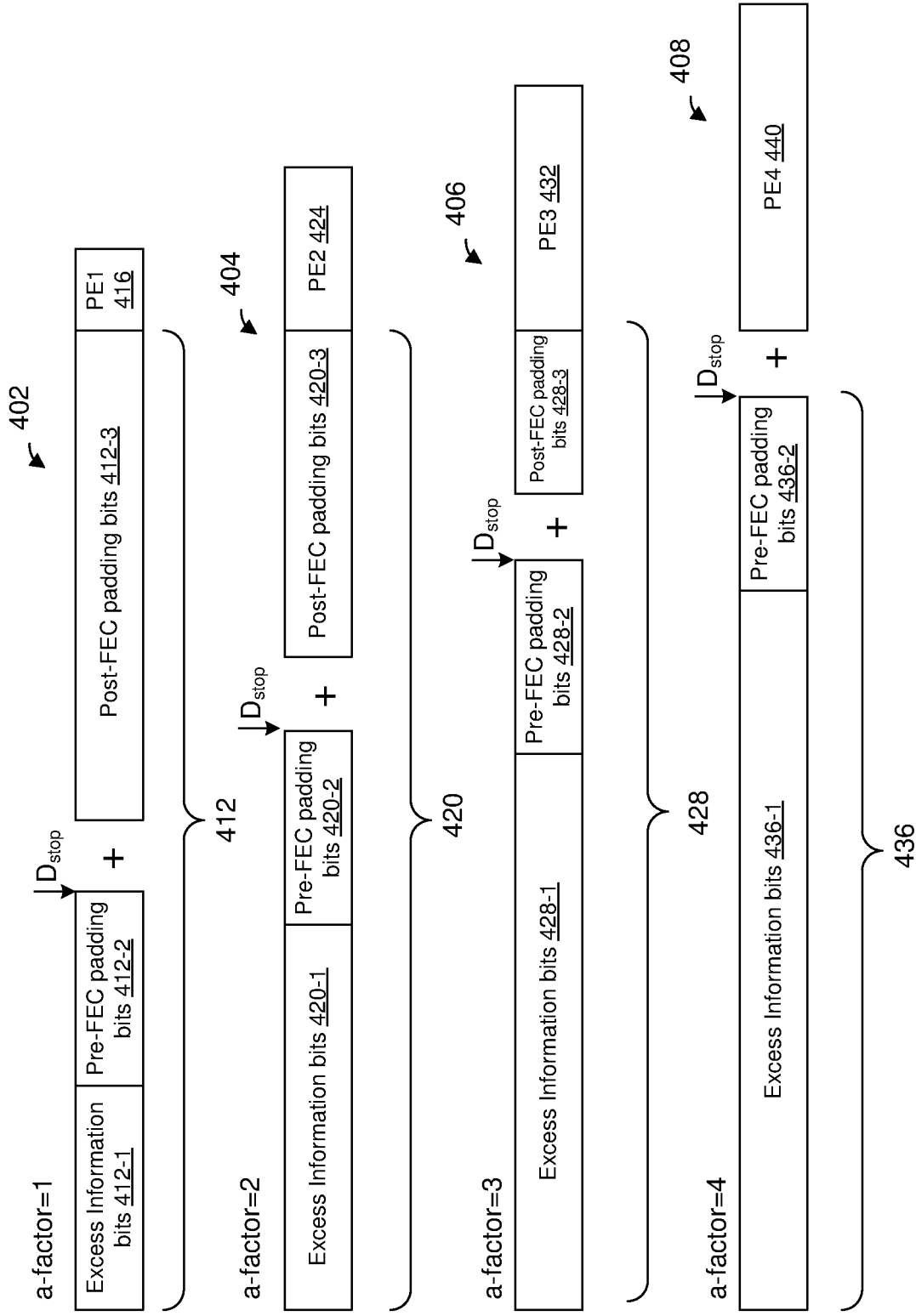
FIG. 4 is a block diagram of different configurations of bit streams in a packet, according to an embodiment.

FIG. 4 is a diagram 400 of different configurations of transmission streams and PE field durations, corresponding to different a-factors, according to an embodiment. In an embodiment, the transmission streams correspond to a last OFDM symbol of a data portion of a packet. In an embodiment, the packet corresponds to the PPDU 200, the last OFDM symbol of the data portion is a last OFDM symbol of the data portion 240, and the PE field corresponds to the PE field 246. Configurations 402, 404, 406, and 408 each correspond to a-factors of 1, 2, 3, and 4 respectively, in an embodiment.

The configuration 402 corresponds to a transmission stream 412, included in a last OFDM symbol of a data portion of a packet. The transmission stream 412 includes excess information bits 412-1, pre-FEC padding bits 412-2, and post-FEC padding bits 412-3. The excess information bits 412-1 and pre-FEC padding bits 412-2 are encoded by an FEC encoder (such as low density parity check, LDPC, encoder) prior to inclusion in the transmission stream 412. The configuration 402 also includes a PE field PE1 416.

The configuration 404 corresponds to transmission stream 420, included in a last OFDM symbol of a data portion of a packet. The transmission stream 420 comprises excess information bits 420-1, pre-FEC padding bits 420-2, and post-FEC padding bits 420-3. The excess information bits 420-1 and pre-FEC padding bits 420-2 are encoded by an FEC encoder prior to inclusion in the transmission stream 420. The configuration 404 also includes a PE field PE2 424. In an embodiment, a number of excess information bits 420-1 is greater than a number of excess information bits 412-1. In an embodiment, a number of post-FEC padding bits 420-3 is smaller than a number of post-FEC padding bits 412-3. Further, in an embodiment, a duration of PE2 424 is greater than a duration of PE1 416.

The configuration 406 corresponds to transmission stream 428, included in a last OFDM symbol of a data portion of a packet. The transmission stream 428 comprises excess information bits 4284, pre-FEC padding bits 428-2, and post-FEC padding bits 428-3. The excess information bits 428-1 and pre-FEC padding bits 428-2 are encoded by an FEC encoder prior to inclusion in the transmission stream 428. The configuration 406 also includes a PE field PE3 432. In an embodiment, a number of excess information bits 428-1 is greater than a number of excess information bits 420-1. In an embodiment, a number of post-FEC padding bits 428-3 is smaller than a number of post-FEC padding bits 420-3. Further, in an embodiment, a duration of PE3 432 is greater than a duration of PE2 424.

The configuration 408 corresponds to transmission stream 436, included in a last OFDM symbol of a data portion of a packet. The transmission stream 436 comprises excess information bits 436-1 and pre-FEC padding bits 436-2. The excess information bits 436-1 and pre-FEC padding bits 436-2 are encoded by an FEC encoder prior to inclusion in the bit stream 436. The configuration 408 also includes a PE field PE4 440. In an embodiment, a number of excess information bits 436-1 is greater than a number of excess information bits 428-1. Further, in an embodiment, a duration of PE4 440 is greater than a duration of PE3 432.

Post-FEC padding bits are not decoded at a communication device receiving a packet including one of the configurations 402-406, according to an embodiment. Therefore, an FEC decoder at the communication device receiving the packet stops receiving input data at $D_{stop}$ as indicated in FIG. 4, and does not decode remaining bits in the packet.

In various embodiments, a maximum duration of a PE field (e.g., the PE1 416, PE2 424, PE3 432, and PE4 440) that may be included in a packet may be limited by a maximum PE field duration defined by the WLAN communication protocol. In an embodiment, the maximum PE field duration is set to 8 μs. In another embodiment, the maximum PE field duration is set to 16 μs. In another embodiment, the maximum PE field duration is selectable to be 8 μs or 16 μs.

In an embodiment, a duration of the PE field is selectable from amongst a plurality of predetermined durations up to and including the maximum PE field duration. In an embodiment, the plurality of predetermined durations consists of multiples of 4 μs (e.g., 4 μs and 8 μs for a maximum PE field duration of 8 μs; 4 μs, 8 μs, 12 μs, and 16 μs for a maximum PE field duration of 16 μs). In an embodiment, the plurality of predetermined durations consists of multiples of 2 μs. In an embodiment, the plurality of predetermined durations consists of multiples of another suitable base duration.

Figure 5:
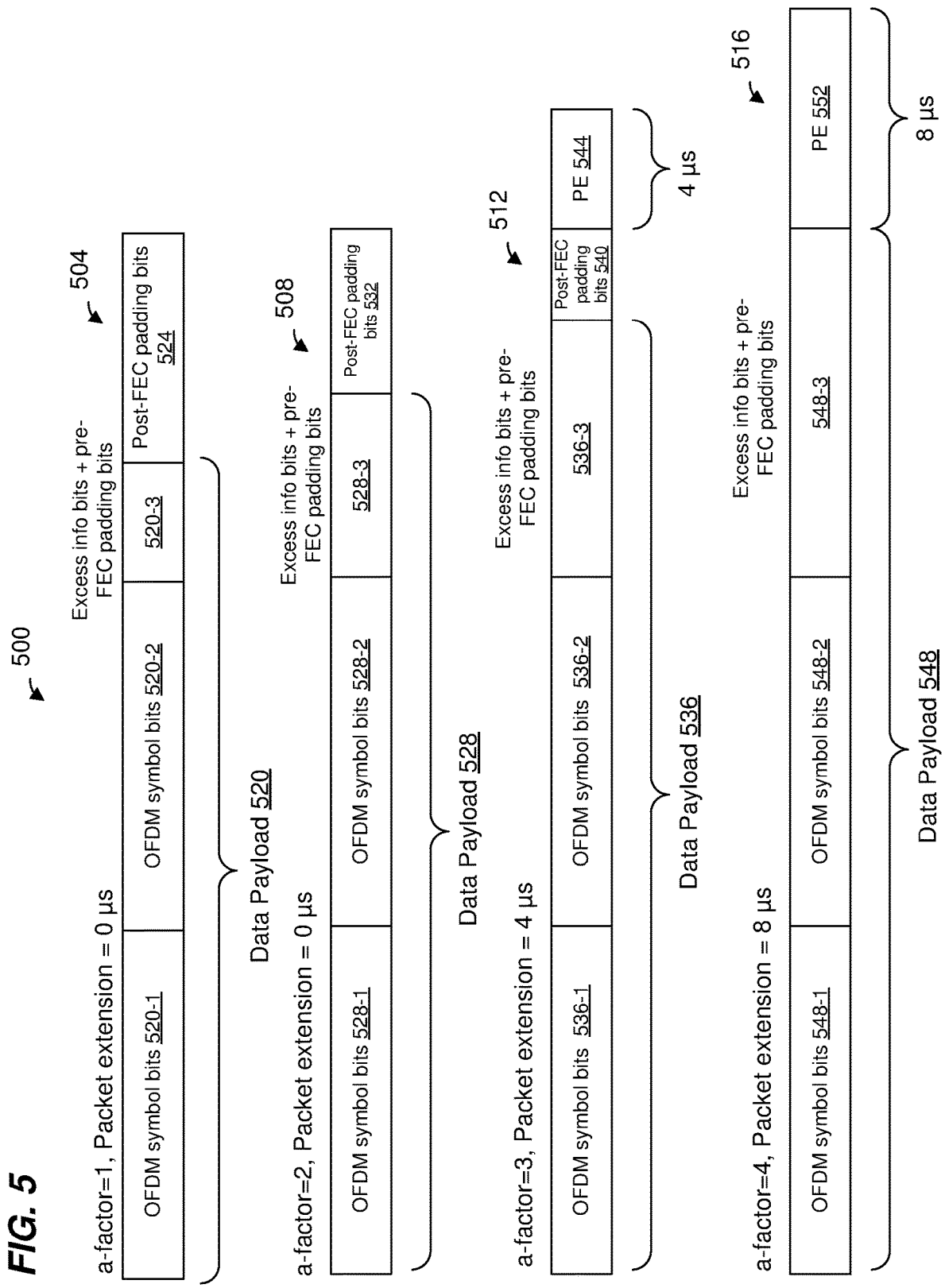
FIG. 5 is a diagram of different configurations of bit streams in a packet, according to another embodiment.

FIG. 5 is a diagram 500 of different configurations of transmission streams and PE field durations, corresponding to different a-factors, according to an embodiment. In an embodiment, the transmission streams correspond to last three OFDM symbols of a data portion of a packet. In an embodiment, the packet corresponds to the PPDU 200, the last three OFDM symbols of the data portion are last OFDM symbols of the data portion 240, and the PE field corresponds to the PE field 246. Configurations 504, 508, 512, and 516 correspond to a-factors of 1, 2, 3, and 4 respectively, in an embodiment. The configurations illustrated in diagram 500 correspond to an embodiment in which a maximum PE field duration is 8 μs.

The configuration 504 comprises data payload 520 and post-FEC padding bits 524 included in a data portion of a packet. The data payload 520 comprises OFDM symbol bits 520-1, OFDM symbol bits 520-2, and bits 520-3. The bits 520-3 correspond to excess information bits and pre-FEC padding bits, as described above with reference to FIG. 4. The OFDM symbol bits 520-1 and the OFDM symbol bits 520-2 each correspond to respective OFDM symbols of the packet, and the bits 520-3 and the post-FEC padding bits 524 together correspond to a last OFDM symbol of the packet. The configuration 504 does not include a PE field (i.e., PE field duration=0 μs).

The configuration 508 comprises data payload 528 and post-FEC padding bits 532 included in a data portion of a packet. The data payload 528 comprises OFDM symbol bits 528-1, OFDM symbol bits 528-2, and bits 528-3. The bits 528-3 correspond to excess information bits and pre-FEC padding bits, as described above with reference to FIG. 4. The OFDM symbol bits 528-1 and the OFDM symbol bits 528-2 each correspond to respective OFDM symbols of the packet, and the bits 528-3 and the post-FEC padding bits 532 together correspond to a last OFDM symbol of the packet. The configuration 508 also does not include a PE field (i.e., PE field duration=0 μs).

The configuration 512 comprises data payload 536, post-FEC padding bits 540, and PE field 544. The data payload 536 and the post-FEC padding bits 540 are included in a data portion of a packet. The data payload 536 comprises OFDM symbol bits 536-1, the OFDM symbol bits 536-2, and bits 536-3. The bits 536-3 correspond to excess information bits and pre-FEC padding bits, as described above with reference to FIG. 4. The OFDM symbol bits 536-1 and the OFDM symbol bits 536-2 each correspond to respective OFDM symbols of the packet, and the bits 536-3 and post-FEC padding bits 540 together correspond to a last OFDM symbol of the packet. The PE field 544 has a duration of 4 μs.

The configuration 516 comprises data payload 548 and PE field 552. The data payload 548 comprises OFDM symbol bits 548-1, the OFDM symbol bits 548-2, and bits 548-3, and are included in a data portion of a packet. The bits 548-3 correspond to excess information bits and pre-FEC padding bits, as described above with reference to FIG. 4. The configuration 508 does not include any post-FEC padding bits. The OFDM symbol bits 548-1 and the OFDM symbol bits 548-2 each correspond to respective OFDM symbols of the packet, and the bits 548-3 correspond to a last OFDM symbol of the packet. The PE field 508-4 has a duration of 8 μs.

Figure 6:
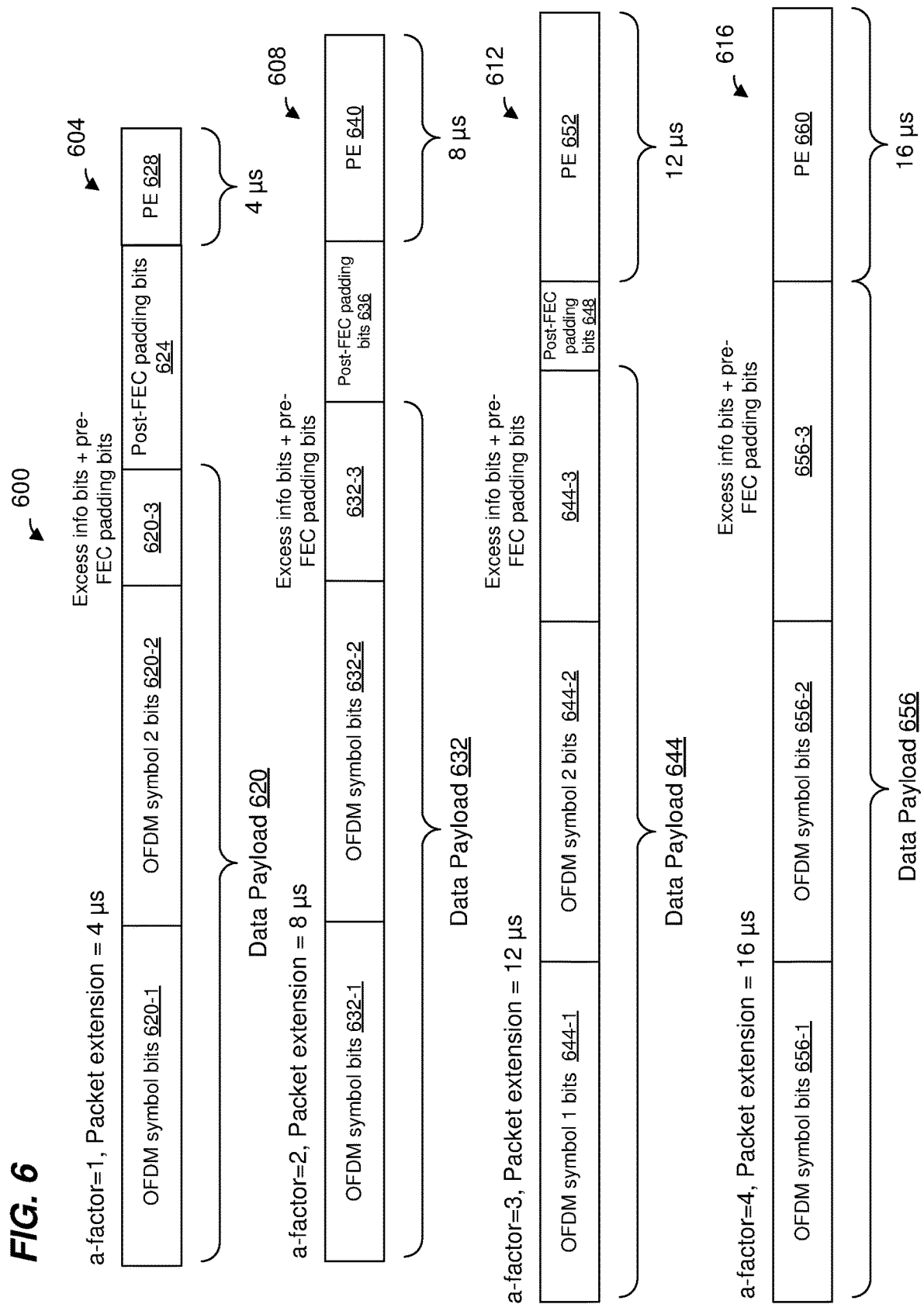
FIG. 6 is a diagram of different configurations of bit streams, as included in a packet, according to another embodiment.

FIG. 6 is a diagram 600 of different configurations of transmission streams and PE field durations, corresponding to different a-factors, according to an embodiment. In an embodiment, the transmission streams correspond to last three OFDM symbols of a data portion of a packet. In an embodiment, the packet corresponds to the PPDU 200 and the last three OFDM symbols of the packet are last three OFDM symbols of the data portion 240. Configurations 604, 608, 612, and 616 correspond to a-factors of 1, 2, 3, and 4 respectively, in an embodiment. The configurations illustrated in diagram 600 correspond to an embodiment wherein a maximum PE field duration is 16 μs.

The configuration 604 comprises data payload 620, post-FEC padding bits 624, and PE field 628. The data payload 620 and the post-FEC padding bits 624 correspond to the data payload 520 and the post-FEC padding bits 524, respectively, and are not discussed in detail for reasons of brevity. The PE field 628 has a duration of 4 μs.

The configuration 608 comprises data payload 632, post-FEC padding bits 636, and PE field 640. The data payload 632 and the post-FEC padding bits 636 correspond to the data payload 528 and the post-FEC padding bits 532, respectively, and are not discussed in detail for reasons of brevity. The PE field 640 has a duration of 8 μs.

The configuration 612 comprises data payload 644, post-FEC padding bits 648, and PE field 652. The data payload 644 and the post-FEC padding bits 648 correspond to the data payload 536 and the post-FEC padding bits 540, respectively, and are not discussed in detail for reasons of brevity. The PE field 652 has a duration of 12 μs.

The configuration 616 comprises of data payload 656 and PE field 660. The data payload 656 corresponds to the data payload 548 and is not discussed in detail for reasons of brevity. The PE field 660 has a duration of 16 μs.

Figure 7:
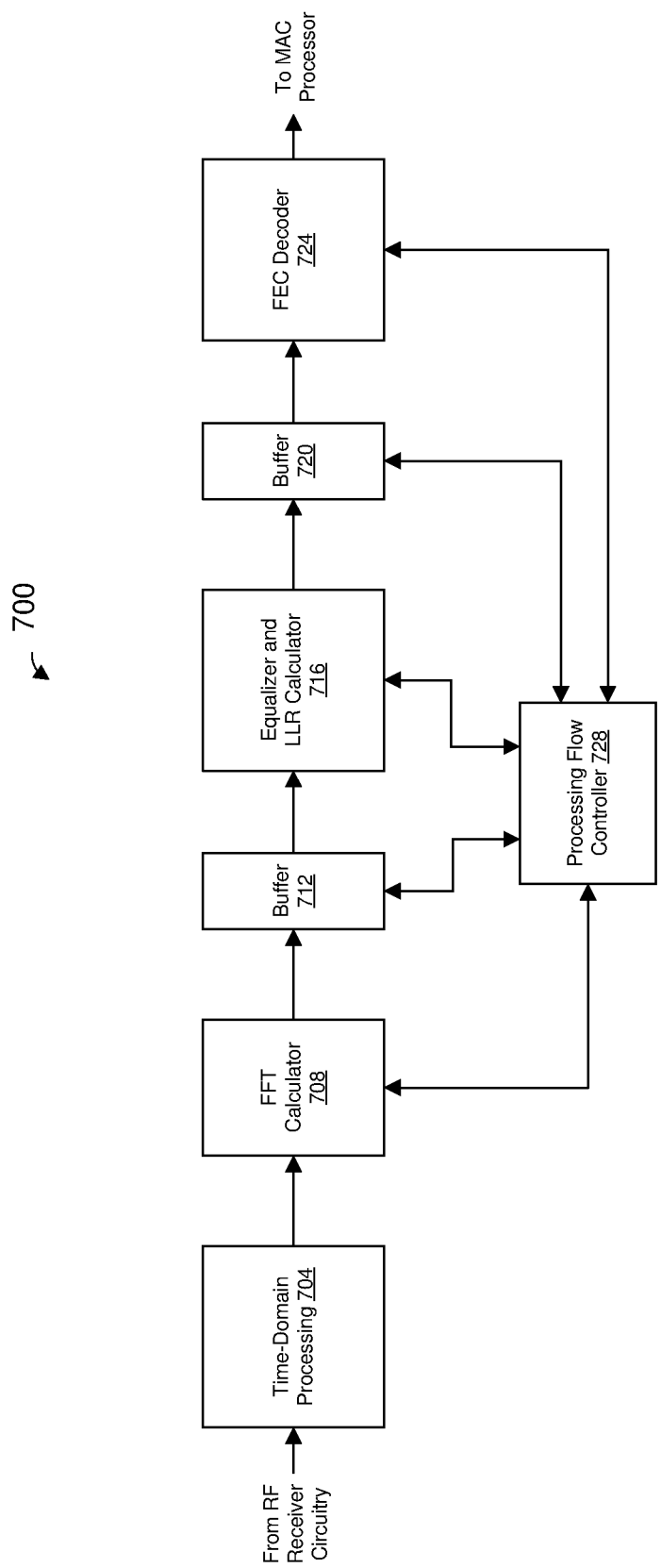
FIG. 7 is a diagram of an example receiver processing subsystem of a PRY processor, according to an embodiment.

FIG. 7 is a diagram of an example receiver processing subsystem 700 of a PHY processor, such as the PHY processor 130 or the PHY processor 170 of FIG. 1, according to an embodiment. The receiver processing subsystem 700 is described with reference to FIG. 1 merely for ease of explanation. In some embodiments, however, the receiver processing subsystem 700 is included in a suitable communication device different from the communication devices of FIG. 1.

The receiver processing subsystem 700 includes time domain processing circuitry 704 that receives one or more signals, corresponding to one or more antennas, from RF receiver circuitry of the PHY processor. The one or more signals received by the time domain processing circuitry 704 correspond to a signal received by a network interface device, such as the network interface device 122 or the network interface device 162 of FIG. 1, according to an embodiment.

The time-domain processing circuitry 704 includes circuitry, such as one or both of i) analog filters and ii) digital filters, that is configured to perform suitable time-domain processing of the one or more signals from RF receiver circuitry. In an embodiment, the time-domain processing circuitry 704 also includes an ADC for converting analog signals to digital signals.

The receiver processing subsystem 700 also includes a discrete Fourier transform (DFT) calculator (e.g., an FFT calculator) 708 coupled to the time-domain processing circuitry 704. The DFT calculator 708 is configured to perform a discrete Fourier transform to convert a set of time-domain samples from the time-domain processing circuitry 704 to a set of frequency-domain samples, according to an embodiment. As an illustrative example, an 80 MHz-wide orthogonal frequency division multiplexing (OFDM) signal according to the latest draft IEEE 802.11ax Standard may have 980 data subcarriers, and thus the DFT calculator 708 generates 980 frequency-domain outputs per OFDM symbol.

At least in some scenarios, at least some outputs of the DFT calculator 708 are stored in a buffer 712, which is coupled to the DFT calculator 708. The buffer 712 comprise a memory device.

The receiver processing subsystem 700 also includes an equalizer and log likelihood ratio (LLR) calculator 716 coupled to the buffer 712 (an optionally the FFT calculator 708). The equalizer and LLR calculator 716 is configured to generate a channel estimate using training fields (HE-LTFs 230, FIG. 2) in a PHY preamble of a packet (e.g., the packet 200), and then use the channel estimate to perform equalization processing on a PHY data portion of the packet. For a MIMO signal, the equalizer and LLR calculator 716 is configured to generate a. MIMO channel estimate using training fields (HE-LTFs 230, FIG. 2) in a PHY preamble of a packet, and then use the MIMO channel estimate to perform matrix equalization (MEQ) processing on a PHY data portion of the packet. Additionally, for OFDM modulated signals, the equalizer and LLR calculator 716 is configured to calculate multiple LLRs for each subcarrier. The number of LLRs per subcarrier is proportional to a modulation and coding scheme (MCS) and a number of spatial streams (SS) used for the received signal. As an illustrative example in the context of the latest draft of the IEEE 802.11ax Standard, one subcarrier of one OFDM symbol is converted to 80 LLRs when eight spatial streams, a 1024 quadrature amplitude modulation (1024-QAM), and a coding rate 5/6 is utilized in the received signal.

The equalizer and LLR calculator 716 operates on frequency-domain samples generated by the FFT calculator 708. In an embodiment, the equalizer and LLR calculator 716 receives at least some of the frequency-domain samples from the buffer 712, at least in some scenarios. In an embodiment, the equalizer and LLR calculator 716 receives at least some of the frequency-domain samples directly from the FFT calculator 708, at least in some scenarios.

In an embodiment, the equalizer and LLR calculator 716 comprises a pipelined architecture comprising hardware components that are reused during processing of an OFDM symbol to reduce the amount of circuitry included in the equalizer and LLR calculator 716 and to complete the processing within a predetermined time budget corresponding to a transmission symbol (e.g., an OFDM symbol) length. Generally, the processing needed to generate the channel estimate in connection with the PHY preamble of the packet is higher than the processing needed to perform equalization and LLR generation in connection with the PHY data portion of the packet. As merely an illustrative example, in connection with a MIMO channel, OFDM modulation, and a particular architecture of the equalizer and LLR calculator 716, MIMO channel estimation for one subcarrier in one HE-LTF OFDM tone reuses hardware components four times, whereas equalization and LLR generation for one subcarrier and one OFDM tone in the PHY data portion reuses the hardware components two times.

One of the hardware components included in the equalizer and LLR calculator 716 and that is reused is a CORDIC (coordinate rotation digital computer) calculator. Each CORDIC calculator comprises circuitry that is configured to "rotate" a complex number by multiplying the complex number by a succession of constant values. In an embodiment, the constant values are powers of 2, so multiplications performed by the CORDIC calculator is performed using shift operations and add operations. The CORDIC calculators are used by the equalizer and LLR calculator 716 to calculate QR decompositions of matrices as part of generating a MIMO channel estimate and as part of performing MEQ, according to an embodiment.

In an embodiment, the equalizer and LLR calculator 716 is controllable to operate at multiple processing speeds, including at least a first processing speed and a second processing speed that is slower than the first processing speed. As merely an illustrative non-limiting example, at the first processing speed the equalizer and LLR calculator 716 is capable of generating LLRs for one OFDM tone in two clock cycles corresponding to a clock signal used by the equalizer and LLR calculator 716, whereas at the second processing speed the equalizer and LLR calculator 716 is capable of generating LLRs for one OFDM tone in three clock cycles of the clock signal.

At least in some scenarios, at least some LLRs generated by the equalizer and LLR calculator 716 are stored in a buffer 720, which is coupled to the equalizer and LLR calculator 716. The buffer 720 comprise a memory device. In some embodiments, the buffer 720 also comprises circuitry configured to convert a format of LLRs output by the equalizer and LLR calculator 716 to a different format expected by a subsequent processing component, such as a forward error correction. (FEC) decoder 724.

The FEC decoder 724 is coupled to the buffer 720 (an optionally the equalizer and LLR calculator 716). The FEC decoder 724 is configured to perform FEC decoding using the LLRs generated by the equalizer and LLR calculator 716. In an embodiment, the FEC decoder 724 include and low density parity check (LDPC) decoder configured to perform LDPC decoding according to an LDPC FEC code. In an embodiment, the LDPC decoder is configured to decode original information bits in a code word (CW) using a set of LLRs corresponding to the CW. Depending on the signal quality, LDPC decoding can take various numbers of iterations. As an illustrative example of a high date rate transmission, corresponding to 1024-QAM with 8 spatial streams and an 80 MHz bandwidth, each OFDM symbol can have up to 41 CWs. In an embodiment, the LDPC decoder can process several CWs in parallel. Outputs (e.g., decoded information bits) generated by the FEC decoder 724 are provided to a MAC processor (e.g., such as the MAC processor 126 or the MAC processor 166), according to an embodiment.

For a constant processing rate of the equalizer and LLR calculator 716, the rate at which LLRs are output by the equalizer and LLR calculator 716 is generally proportional to a data rate of the received signal. In some embodiments and in at least some scenarios, a rate at which the FEC decoder 724 processes LLRs is slower than a rate at which the equalizer and LLR calculator 716 generates LLRs. For example, for at least some high data rates (e.g., corresponding to 1024-QAM and 8 spatial streams), the FEC decoder 724 is not able to process LLRs at the same rate as they are being generated by the equalizer and LLR calculator 716. As a result, the number of LLRs stored in the buffer 720 will tend to rise over time during the processing of a packet until the equalizer and LLR calculator 716 is finished generating LLRs for the packet, at least for some high data rates (e.g., corresponding to 1024-QAM and 8 spatial streams).

The receiver processing subsystem 700 also includes a processing flow controller 728 coupled to the equalizer and LLR calculator 716. The processing flow controller 728 is also coupled to one or both of the buffer 720 and the FEC decoder 724, according to some embodiments. The processing flow controller 728 is also coupled to one or both of the FFT calculator 708 and the buffer 712, according to some embodiments.

The processing flow controller 728 is configured to control the processing rate of the equalizer and LLR calculator 716 so that, for packets with certain high data rates (e.g., corresponding to 1024-QAM and 8 spatial streams), the processing speed of the equalizer and LLR calculator 716 is reduced (as compared to slower data rates) so that the rate at which the equalizer and LLR calculator 716 generates LLRs is reduced. For instance, in an embodiment, a processing speed of the equalizer and the LLR calculator 716 is reduced during the processing of a PHY data portion of a packet as compared to a processing speed during the processing of a PHY preamble portion of the packet. When the processing speed of the equalizer and LLR calculator 716 is reduced for some high data rates (e.g., corresponding to 1024-QAM and 8 spatial streams), a required size of the buffer 720 can be reduced, thus reducing a cost of the receiver processing subsystem 700 (and thus the cost of the network interface device that includes the receiver processing subsystem 700), at least in some embodiments. In some embodiments, if the equalizer and LLR calculator 716 operated at the first processing speed for a certain high data rate, the buffer 720 would overflow when processing a packet, whereas reducing the processing speed of the equalizer and LLR calculator 716 to the second processing speed prevents the buffer 720 from overflowing. In some embodiments, reducing the processing speed of the equalizer and LLR calculator 716 for higher data rates further advantageously reduces the power consumption of the receiver processing subsystem 700.

In an embodiment, the processing flow controller 728 receives data rate information for a packet being processed, and uses the data rate information to control (e.g., select) the processing speed of the equalizer and LLR calculator 716. For example, a PHY preamble of the packet includes data rate information (e.g., in the HE-SIG-A 220 for an IEEE 802.11ax packet or in one or more other suitable fields for other types of packets) and a network interface device that includes the receiver processing subsystem 700 provides data rate information extracted from the PHY preamble to the processing flow controller 728.

In some embodiments, the processing flow controller 728 is additionally configured to monitor a fill level of the buffer 720 and to reduce the processing rate of the equalizer and LLR calculator 716 based on whether the fill level reaches a threshold. In some embodiments, the processing flow controller 728 is additionally configured to monitor the fill level of the buffer 720 and to increase the processing rate of the equalizer and LLR calculator 716 based on whether the fill level falls below the threshold (or another threshold, e.g., employing hysteresis). In some embodiments, the processing flow controller 728 is additionally configured to monitor a rate at which the FEC decoder 724 is processing LLRs, and to adjust the processing rate of the equalizer and LLR calculator 716 based on the rate at which the FEC decoder 724 is processing LLRs.

In some embodiments, the processing flow controller 728 is additionally configured to monitor a fill level of the buffer 712 and to reduce a processing rate of the FFT calculator 708 and/or increase the processing rate of the equalizer and LLR calculator 716 based on whether the fill level reaches a threshold. In some embodiments, the processing flow controller 728 is additionally configured to monitor the fill level of the buffer 720 and to increase the processing rate of the FFT calculator 708 and/or decrease the processing rate of the equalizer and LLR calculator 716 based on whether the fill level falls below the threshold (or another threshold, e.g., employing hysteresis). In some embodiments, the processing flow controller 728 is additionally configured to monitor a rate at which the equalizer and LLR calculator 716 is processing frequency-domain samples, and to adjust the processing rate of the FFT calculator 708 based on the rate at which the equalizer and LLR calculator 716 is processing frequency-domain samples.

Figure 8:
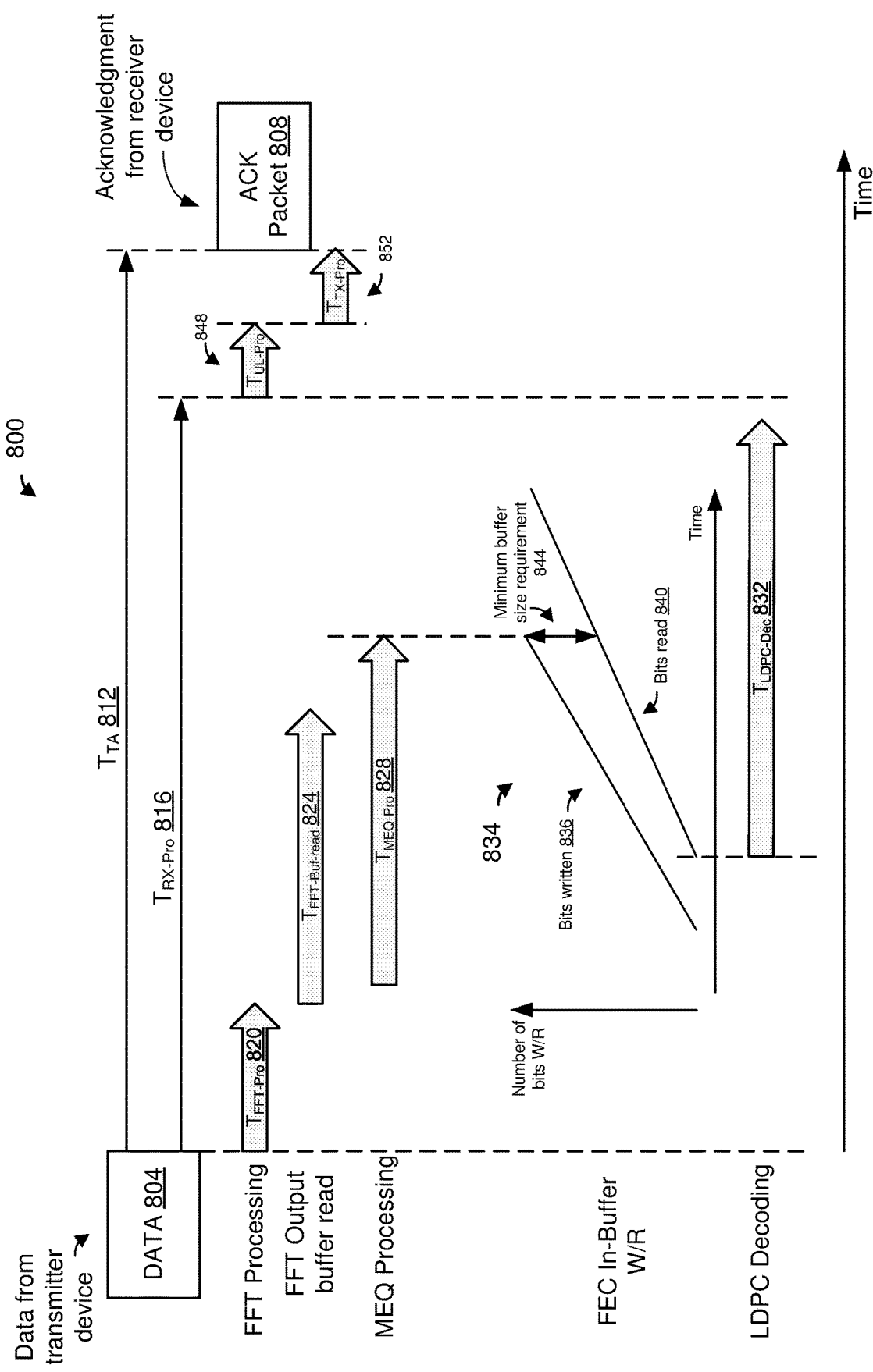
FIG. 8 is a timing diagram of processing operations performed by a communication device in connection with processing a received packet and transmitting an acknowledgment (ACK) packet, according to an embodiment.

FIG. 8 is a timing diagram 800 of processing operations performed by a communication device in connection with processing a received packet and transmitting an ACK packet, according to an embodiment. The timing diagram 800 illustrates a timing budget for various processing operations at a receiver device regarding reception of the packet and transmission of the ACK packet. In an embodiment, the receiver device is the client station 154 and the processing operations are implemented at the network interface device 162 of FIG. 1. In some embodiments, the receiver device is the AP 114 and the processing operations are implemented at the network interface device 122 of FIG. 1. In still other embodiments, the processing operations are implemented at another suitable communication device.

The receiver device receives and processes data 804, transmitted by a transmitter device, included in a packet and transmits an ACK packet 808 after a time duration that is equal to a turn-around time ($T_{TA}$) 812. In an embodiment, the data 804 corresponds to data included in a data portion of the packet (e.g., the data portion 240), In an embodiment, a receiver processing subsystem (similar to the receiver processing subsystem 700) of the receiver device implements receive processing operations during receive processing time ($T_{RX-Pro}$) 816. The receiver processing operations are described with reference to the receiver processing subsystem 700 merely for explanatory purposes and in other embodiments a different suitable receiver processing subsystem implements the receive processing operations.

The $T_{RX-Pro}$ 816 comprises an FFT processing time ($T_{FFT-Pro}$) 820 corresponding to operations performed by the FFT calculator 708, FFT output buffer read time ($T_{FFT-Buf-read}$) 824 corresponding to the equalizer and LLR calculator 716 reading frequency-domain samples from the buffer 712, MEQ processing time ($T_{MEQ-Pro}$) 828 corresponding to the equalizer and LLR calculator 716 generating LLRs, and LDPC decoding time ($T_{LDPC-Dec}$) 832 corresponding to the FEC decoder 724 processing the LLRs and decoding the data 804. Operations performed during the $T_{FFT-Pro}$ 820, the $T_{MEQ-Pro}$ 828, and the $T_{LDPC-Dec}$ 832 are described above with reference to the FFT calculator 708, the equalizer and LLR calculator 716, and the FEC decoder 724 merely for explanatory purposes, in an embodiment.

As explained above, at least some LLRs generated by the equalizer and LLR calculator 716 are stored in the buffer 720 coupled to the equalizer and LLR calculator 716. A timing subdiagram 834 illustrates timing of the equalizer and LLR calculator 716 writing data to the buffer 720 and the FEC decoder 724 reading data to the buffer 720, according to an embodiment. Bits written 836 illustrates a quantity of bits corresponding to the LLRs generated by the equalizer and LLR calculator 716 and stored in the buffer 720 over time. Bits read 840 represents a quantity of bits read by the FEC decoder 724 from the buffer 720 over time during LDPC decoding operations.

As illustrated in FIG. 8, bits are read by the FEC decoder 724 at a slower rate as compared to a rate of bit storage by the equalizer and LLR calculator 716. Additionally, there is a delay between when the equalizer and LLR calculator 716 starts writing bits to the buffer 720 and when the FEC decoder 724 starts reading bits from the buffer 720. Bits that are read from the buffer 720 may be overwritten by new bits from the equalizer and LLR calculator 716, in an embodiment. Therefore, a minimum buffer size requirement 844 corresponds to a maximum difference between total number of bits written by the equalizer and LLR calculator 716 and total number of bits read by the FEC decoder 724 after the equalizer and LLR calculator 716 finishes its operations corresponding to the data 804.

During up-layer processing time ($T_{UL\text{-}Pro}$) 848, the receiver device performs higher layer processing operations (e.g., MAC layer operations) to process data 804. After the FEC decoder 724 finishes decoding operations and the network interface device completes up-layer processing of the data 804, the receiver device is ready to implement functions to transmit the ACK packet 808. During transmit processing time ($T_{TX\text{-}Pro}$) 852 the network interface device generates the ACK packet 808, and upon the end $T_{TX\text{-}Pro}$, begins transmitting the ACK packet 808.

Referring to the timing subdiagram 834, for certain high data rate transmission configurations (e.g., using high order modulations such as QAM-1024), the rate at which the equalizer and LLR calculator 716 stores bits to the buffer 720 is significantly higher than the rate at which the FEC decoder 724 reads bits from the buffer 720 when the equalizer and LLR calculator 716 operates at the first processing speed (high speed). As a result, the minimum buffer size requirement 844 would be required to be higher for the network interface device to be able to handle such high data rates, which would require a larger buffer 720, which would increase cost of the network interface device. Therefore, in an embodiment, the processing flow controller 728 is configured to cause the equalizer and LLR calculator 716 to operate at the second processing speed (slower speed) for certain high data rate transmission configurations. By operating at the second processing speed (slower speed) for certain high data rate transmission configurations, the difference between the rate at which the equalizer and LLR calculator 716 stores bits to the buffer 720 and the rate at which the FEC decoder 724 reads bits from the buffer 720 is reduced, thus reducing the minimum buffer size requirement 844, which allows a smaller size buffer 720, which decreases the cost of the network interface device.

When the processing flow controller 728 causes the equalizer and LLR calculator 716 to operate at the second processing speed (slower speed) for certain high data rate transmission configurations, the $T_{MEQ\text{-}Pro}$ 828 is increased (as compared to if the equalizer and LLR calculator 716 operated at the first processing speed (high speed)). As explained above with reference to FIG. 3, in various embodiments, certain restrictions may be placed on a duration of turn-around time between an end of reception of a packet and a beginning of transmission of an ACK packet. In some embodiments, even when the equalizer and LLR calculator 716 operates at the second processing speed (slower speed) for certain high data rate transmission configurations, the $T_{TA}$ 812 is less than or equal maximum allowable turn-around duration, $T_{TA,max}$, defined by the communication protocol.

In some embodiments and/or scenarios, however, if the data 804 is transmitted at a particular high rate (e.g., at an MCS corresponding to a high rate, such as when the data 804 is transmitted using 1024-QAM modulation) and the equalizer and LLR calculator 716 is operating at the second processing speed (slower speed), the receiver device may be unable to process the data 804 and begin transmitting the ACK packet 808 within the $T_{TA,max}$ (i.e., $T_{TA}$ 812>$T_{TA,max}$). In such scenarios, the network interface device is configured to negotiate with the transmitter of the packet data 804, prior to transmission of the packet data 804, to require the transmitter to append PE fields to packets that are transmitted to the network interface device at certain high data rates. Inclusion of the PE field provides the network interface device more time to process the data 804 before beginning transmission of the ACK packet 808, i.e., effectively increases the $T_{TA,max}$.

Figure 9:
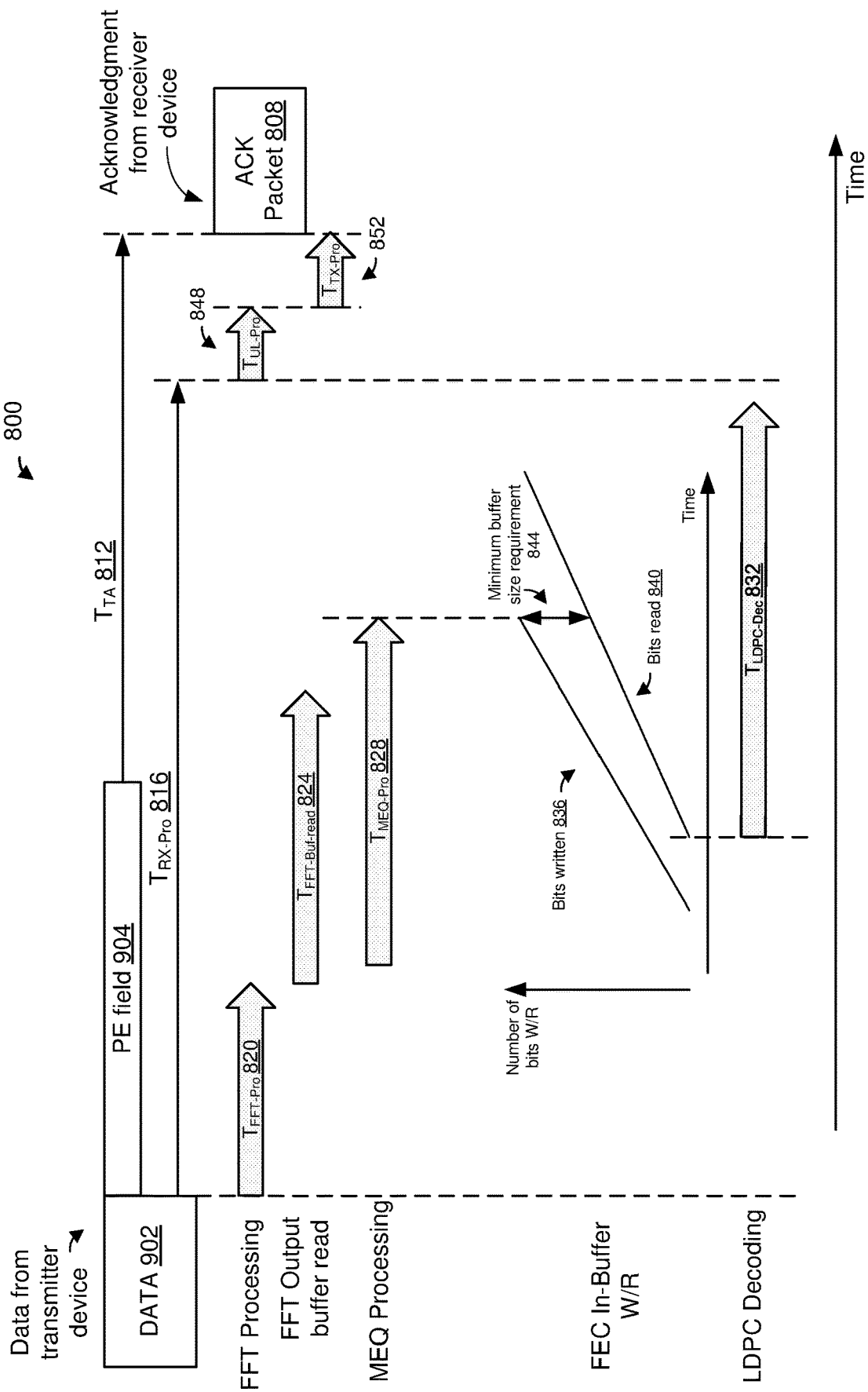
FIG. 9 is a timing diagram of an example packet exchange between two devices, according to another embodiment.

FIG. 9 is a timing diagram 900 of an example packet exchange between two communication devices, according to another embodiment. The timing diagram 900 illustrates a timing budget for various processing operations at a communication device following reception of data and prior to transmission of an ACK packet. In an embodiment, the receiver device is the client station 154 and the processing operations are implemented at the network interface device 162 of FIG. 1. In another embodiment, the receiver device is the AP 114 and the processing operations are implemented at the network interface device 122 of FIG. 1. In still other embodiments, the processing operations are implemented at another suitable communication device. Like-numbered elements of the timing diagram 900 are similar to those of the timing diagram 800 and are not discussed in detail for reasons of brevity.

The timing diagram 900 illustrates a timing budget for various processing operations at a receiver device in connection with reception of data 902 and prior to the beginning of transmission of the ACK packet 808. In an embodiment, the data 902 corresponds to data included in a data portion of the packet (e.g., the data portion 240). A PE field 904 is appended to an end of the packet. In various embodiments, the PE field 904 is similar to PE fields as described above with reference to FIGS. 5 and 6. In various embodiments, the PE field 904 is of a duration of 4 µs, 8 µs, or 16 µs, etc.

Because the PE field 904 is not processed at the receiver device and because $T_{TA}$ 812 is measured starting from the end of the PE field 904 of the packet, the receiver device is provided with additional time to process the data 902 and being transmitting the ACK packet 808. For instance, the equalizer and LLR calculator 716 may store LLR data to the buffer 729 during the PE field 904 and the FEC decoder 724 may process outputs of the equalizer and LLR calculator 716 during the PE field 904, resulting in additional allowed time between the end of reception of the data 902 and the beginning of transmission of the ACK packet 808. This allows the receiver device to maintain the $T_{TA}$ 812 to be less than or equal to the $T_{TA,\ max}$.

In an embodiment, the receiver device may transmit a packet to the transmitter device, prior to transmission of the packet 902 by the transmitter device, that includes indications of one or more of i) whether the PE field 904 must be included when transmitting the data 902, ii) a duration of the PE field 904 that is to be used by the transmitter device when transmitting the data 902, iii) a minimum duration of the PE field 904 that is to be used by the transmitter device when transmitting the data 902, and iv) a maximum allowable PE field duration that may to be used by the transmitter device when transmitting the data 902.

In an embodiment, the receiver device may transmit a packet to the transmitter device, prior to transmission of the packet 902 by the transmitter device, that includes indications of one or more of i) whether the PE field 904 must be included when transmitting packets at certain data rates and/or certain MCSs, ii) a duration of the PE field 904 that is to be used by the transmitter device when transmitting packets at certain data rates and/or certain MCSs, iii) a minimum duration of the PE field 904 that is to be used by the transmitter device when transmitting packets at certain data rates and/or certain MCSs, and iv) a maximum allowable PE field duration that may to be used by the transmitter device when transmitting packets at certain data rates and/or certain MCSs.

In various embodiments, the receiver device or the transmitter device makes a determination of one or more of the above factors based on one or more of i) device capabilities (e.g., processing speed of the receiver processing subsystem) of the receiver device, ii) allowed MCS(s) to be utilized for data transmission between the transmitter device and the receiver device (e.g., an MCS utilized for transmission of the data 902), and $T_{TA, \ max}$ requirement set by the WLAN communication protocol.

In an embodiment, the determination of whether to include the PE field 904 is performed by the transmitter device and based on information received from the receiver device. In an embodiment, the transmitter is configured to automatically include the PE field 904 in the packet when generating and transmitting the data 902 at a certain data rates and/or MCSs (e.g., for MCSs corresponding to data rates above a threshold value).

In other embodiments, a transmitter device includes the PE field 904 in the packet in response to a request by the receiver device. For instance, in an embodiment, the receiver device indicates to the transmitter device that if the data 902 is generated and transmitted at a particular MCS (e.g., an MCS corresponding to a data rate above a threshold value), a packet including the data 804 must also include the PE field 904.

As described above with reference to FIGS. 5 and 6, a maximum PE field duration can be set to different values (e.g., 8 μs, 16 μs, etc.). The maximum PE field duration may be selected/negotiated by the transmitter device and/or the receiver device based on respective capabilities of the two devices. As merely an illustrative example, in an embodiment, the data 902 corresponds to a bandwidth of 80 MHz and is transmitted over 8 spatial streams (MCS 11 in an embodiment) and the FEC decoder 724 requires 13.6 μs to decode 41 codewords. However, hardware restrictions at the receiver device result in a time budget for LDPC decoding (i.e., $T_{LDPC-Dec}$ 832) of only about 7 μs if the $T_{TA, \ max}$ requirement is to be met. In such scenarios, a PE field appended to the packet provides additional time for processing the data 902. In the above example, a PE field duration of 8 μs is sufficient to provide additional processing time for the receiver device. Therefore, a PE field duration of 8 μs is selected to maintain the $T_{TA, \ max}$ requirement imposed by the WLAN communication protocol. In an embodiment, the receiver device indicates to the transmitter device that a minimum PE field duration of 8 μs is to be used by the transmitter device when transmitting packets to the receiver device at a particular one or more data rates and/or MCSs. In an embodiment, the receiver device may indicate this information prior to transmission of the data 902 by the transmitter device.

In various embodiments, a particular data rate and/or MCS utilized for transmission of the packet may override consideration of the a-factor in determining whether a PE field is to be included in the packet. For instance, with reference to FIG. 5, the transmitter device may elect to include a PE field in the configuration 508, even though the configuration 508 has an a-factor of 2, if it determines that a data rate corresponding to an MCS utilized for a packet including the configuration 508 corresponds to a data rate that is greater than a threshold data rate and/or is in a set of particular data rates that require a PE when sending packets to the receiver device. In an embodiment, the threshold data rate corresponds to a processing speed of the receiver device.

Figure 10:
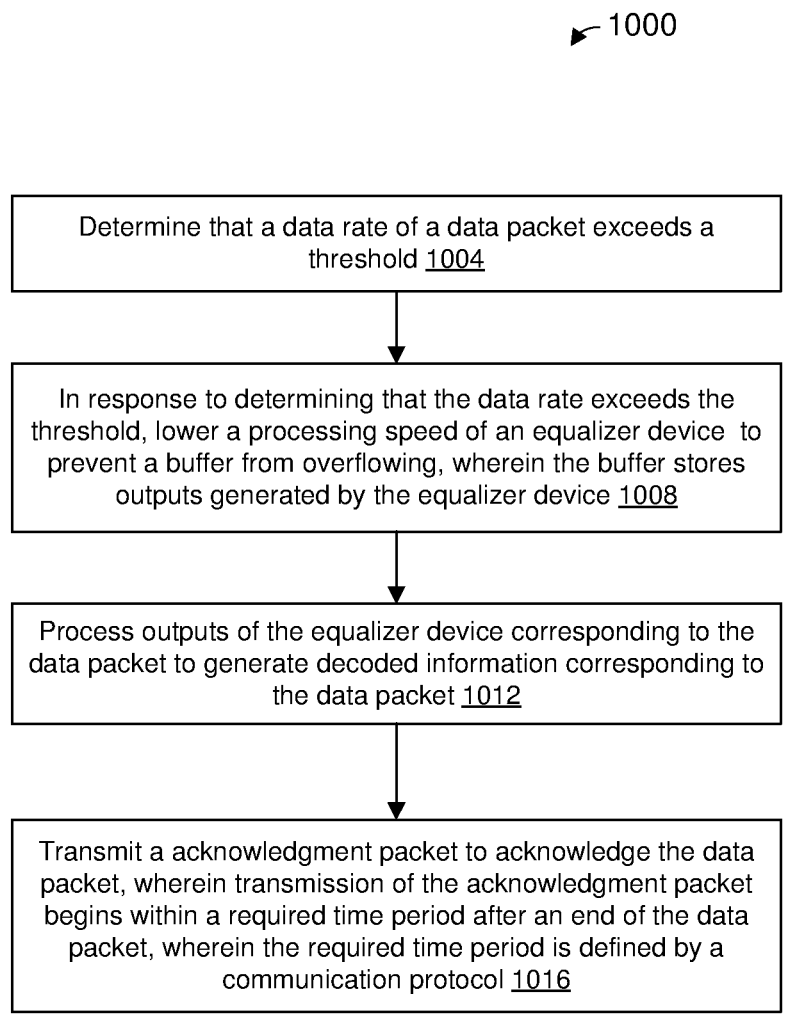
FIG. 10 is a flow diagram of an example method for transmitting an acknowledgment to the packet, according to an embodiment.

FIG. 10 is a flow diagram of an example method 1000 for processing data in a received data packet and transmitting an acknowledgment of the received data packet, according to an embodiment. In some embodiments, the client station 154 of FIG. 1 is configured to implement the method 1000. The method 1000 is described, however, in the context of the client station 154 merely for explanatory purposes and, in other embodiments, the method 1000 is implemented by another suitable device, such as the AP 114 or any other communication device.

At block 1004, the client station 154 determines that a data rate of the received data packet exceeds a threshold. For instance, in an embodiment, the client station 154 determines that an MCS utilized to transmit the received data packet corresponds to a data rate that exceeds the threshold. In an embodiment, the threshold is determined based on a size of a buffer (such as the buffer 720) used for storing LLRs as generated by an equalizer and LLR calculator (such as the equalizer and LLR calculator 716).

At block 1008, in response to determining that the data rate exceeds the threshold, the client station 154 lowers a processing speed of an equalizer device of the client station 154 to prevent the buffer from overflowing. For instance, with reference to the receiver processing subsystem 700, the client station 154 lowers the processing speed of the equalizer and LLR calculator 716 (e.g., sets the processing speed to the second processing speed).

At block 1012, an FEC decoder device of the client station 154 processes outputs of the equalizer device corresponding to the first data packet to generate first decoded information corresponding to the first data packet. For instance, with reference to the receiver processing subsystem 700, the FEC decoder device 724 processes the outputs of the equalizer and LLR calculator 716 (as stored in the buffer 720) and generates decoded information.

At block 1016, the client station 154 transmits the ACK packet to acknowledge the data packet. Transmission of the ACK packet begins within a required time period after an end of the data packet, and the required time period is defined by the WLAN communication protocol, according to an embodiment. For instance, as described with reference to FIGS. 8 and 9, the client station 154 begins transmitting the ACK packet within the $T_{TA,max}$ following the end of the packet including the data 804/902.

Figure 11:
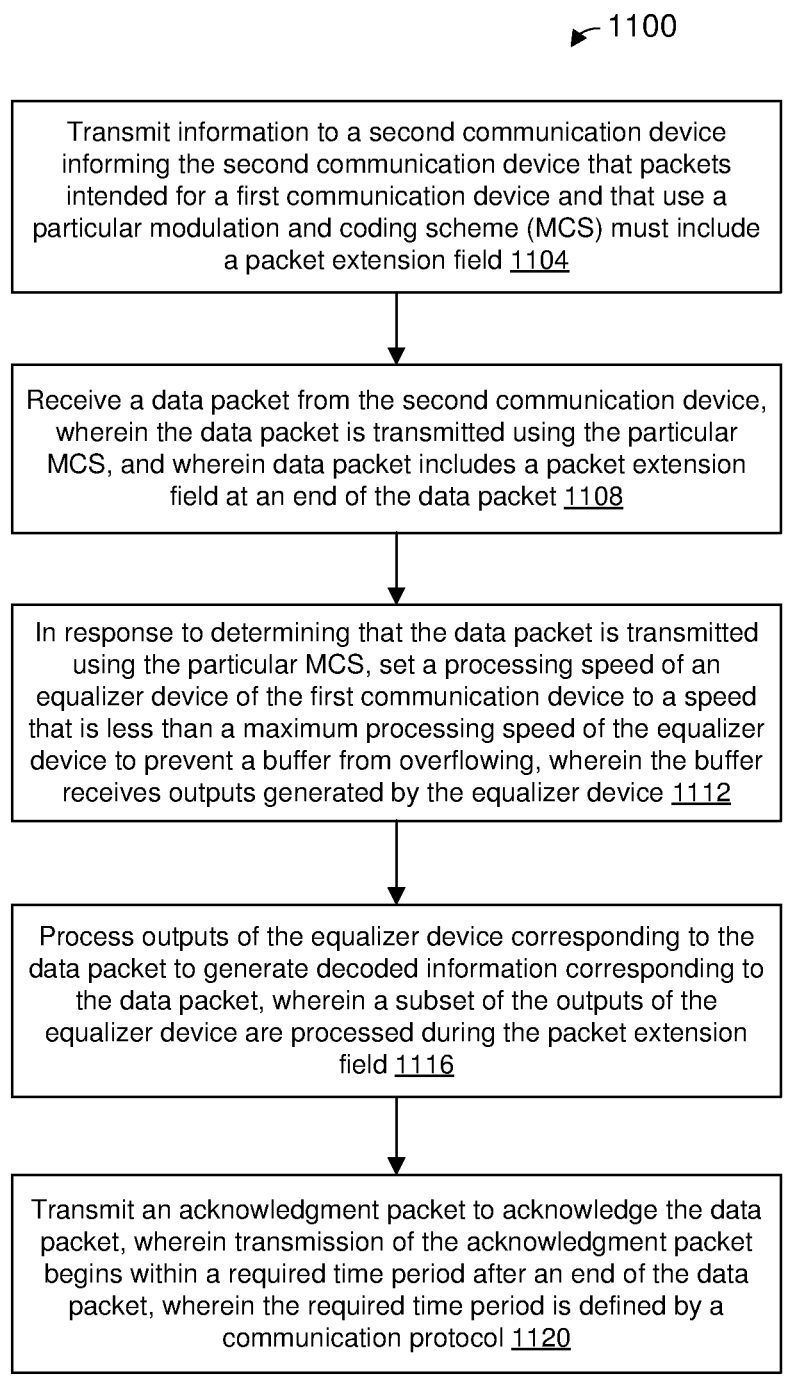
FIG. 11 is a flow diagram of an example method for transmitting an acknowledgment to the packet, according to another embodiment.

FIG. 11 is a flow diagram of an example method 1100 for processing data in a received data packet and transmitting an acknowledgment of the received data packet, according to an embodiment. In some embodiments, the client station 154 of FIG. 1 is configured to implement the method 1100. The method 1000 is described, however, in the context of the client station 154 merely for explanatory purposes and, in other embodiments, the method 1100 is implemented by another suitable device, such as the AP 114 or any other communication device.

At block 1104, the client station 154 transmits information to another communication device (e.g., the AP 114) informing the other communication device that packets intended for the client station 154 and transmitted at one or more particular data rates and/or MCSs must include a PE field. In an embodiment, the one or more particular data rates and/or MCSs corresponds to a high data rate that exceeds a threshold. In an embodiment, the threshold corresponding to a processing speed at the client station 154.

At block 1108, the client station 154 receives the data packet from the other communication device. The data packet is transmitted at one of the particular data rate(s) and/or using one of the particular MCS(s), and the data packet includes a PE field at an end of the data packet, according to an embodiment. In an embodiment, the PE field corresponds to a PE field as described above with reference to FIG. 5, 6, or 9.

At block 1112, in response to determining that the data packet is transmitted at one of the particular data rate(s) and/or using one of the particular MCS(s), the client station 154 sets a processing speed of an equalizer device of the client station 154 to a speed that is less than a maximum processing speed of the equalizer device to prevent a buffer from overflowing. The buffer receives outputs generated by the equalizer device, according to an embodiment. For instance, with reference to the receiver processing subsystem 700, the client station 154 sets the processing speed of the equalizer and LLR calculator 716 to a speed that is less than a maximum processing speed to prevent the buffer 720 from overflowing (e.g., sets the processing speed of the equalizer and LLR calculator 716 to the second processing speed, where the first processing speed is a maximum processing speed of the equalizer and LLR calculator 716).

At block 1116, an FEC decoder device of the client station 154 processes outputs of the equalizer device corresponding to the data packet to generate decoded information corresponding to the data packet. At least a subset of the outputs of the equalizer device are processed by the FEC decoder device during the PE field, according to an embodiment. For instance, with reference the receiver processing subsystem 700, the FEC decoder 724 retrieves and processes LLRs stored in the buffer 720 of the client station 154.

At block 1120, the client station 154 transmits an acknowledgment packet to acknowledge the data packet. Transmission of the acknowledgment packet begins within a required time period after an end of the data packet, and the required time period is defined by a communication protocol, according to an embodiment. For instance, as described in FIG. 9, the client station 154 begins transmitting the ACK packet within the $T_{IA,max}$ following the end of reception of the packet including the data 804.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   determining, at a communication device, that a data rate of a data packet exceeds a threshold;
   in response to determining that the data rate exceeds the threshold, lowering a processing speed of an equalizer device of the communication device to prevent a buffer from overflowing, wherein the buffer stores outputs generated by the equalizer device;
   processing, by a forward error correction code decoder device of the communication device, outputs of the equalizer device corresponding to the data packet to generate decoded information corresponding to the data packet; and
   transmitting, by the communication device, an acknowledgment packet to acknowledge the data packet, wherein transmission of the acknowledgment packet begins within a required time period after an end of the data packet, wherein the required time period is defined by a communication protocol.

2. The method of claim 1, further comprising:
   negotiating, by the communication device, with a transmitter of the first data packet so that the transmitter includes a packet extension field at an end of the data packet;
   wherein the packet extension field enables the communication device to begin transmitting the acknowledgment packet within the required time period after the end of the data packet when the processing speed of the equalizer device is lowered to prevent the buffer from overflowing.

3. The method of claim 1, wherein:
   the equalizer device is a matrix equalizer device; and
   the outputs of the matrix equalizer device corresponding to the data packet include log likelihood ratio (LLR) values corresponding to data in the packet.

4. The method of claim 3, wherein:
   the forward error correction code decoder device is a low density parity check (LDPC) decoder device; and
   processing outputs of the equalizer device comprises performing, by the LDPC decoder device, LDPC decoding using the LLR values.

5. The method of claim 1, wherein the data packet is a first data packet, the data rate is a first data rate, the decoded information is a first decoded information, and the acknowledgment packet is a first acknowledgment packet, and wherein the method further comprises:
   determining, at the communication device, that a second data rate of a second data packet does not exceed the threshold;
   in response to determining that the second data rate does not exceed the threshold, raising the processing speed of the equalizer device;
   processing, by the forward error correction code decoder device, outputs of the equalizer device corresponding to the second data packet to generate second decoded information in the second data packet; and
   transmitting, by the communication device, a second acknowledgment packet to acknowledge the second data packet, wherein transmission of the second acknowledgment packet begins within the required time period after an end of the second data packet.

6. An apparatus, comprising:
a network interface device associated with a communication device, wherein the network interface device includes one or more integrated circuits (ICs) configured to:
   determine that a data rate of a data packet exceeds a threshold,
   in response to determining that the data rate exceeds the threshold, lower a processing speed of an equalizer device of the communication device to prevent a buffer from overflowing, wherein the buffer stores outputs generated by the equalizer device,
   process, using a forward error correction code decoder device of the communication device, outputs of the equalizer device corresponding to the data packet to generate decoded information corresponding to the data packet, and
   transmit an acknowledgment packet to acknowledge the data packet, wherein transmission of the acknowledgment packet begins within a required time period after an end of the data packet, wherein the required time period is defined by a communication protocol.

7. The apparatus of claim 6, wherein the one or more ICs are further configured to:
   negotiate with a transmitter of the data packet so that the transmitter includes a packet extension field at an end of the data packet;
   wherein the packet extension field enables the communication device to begin transmitting the acknowledgment packet within the required time period after the end of the data packet when the processing speed of the equalizer device is lowered to prevent the buffer from overflowing.

8. The apparatus of claim 6, wherein:
the equalizer device is a matrix equalizer device; and
the outputs of the matrix equalizer device corresponding to the data packet include log likelihood ratio (LLR) values corresponding to data in the packet.

9. The apparatus of claim 8, wherein:
the forward error correction code decoder device is a low density parity check (LDPC) decoder device; and
the LDPC decoder device is configured to perform LDPC decoding using the LLR values.

10. The apparatus of claim 6, wherein the data packet is a first data packet, the data rate is a first data rate, the decoded information is a first decoded information, and the acknowledgment packet is a first acknowledgment packet, and wherein the one or more ICs are further configured to:
   determine that a second data rate of a second data packet does not exceed the threshold;
   in response to determining that the second data rate does not exceed the threshold, raise the processing speed of the equalizer device;
   process, using the forward error correction code decoder device, outputs of the equalizer device corresponding to the second data packet to generate second decoded information in the second data packet; and
   transmit a second acknowledgment packet to acknowledge the second data packet, wherein transmission of the second acknowledgment packet begins within the required time period after an end of the second data packet.

11. A method, comprising:
transmitting, by a first communication device, information to a second communication device informing the second communication device that packets intended for the first communication device and that use a particular modulation and coding scheme (MCS) must include a packet extension field;
receiving, at the first communication device, a data packet from the second communication device, wherein the data packet is transmitted using the particular MCS, and wherein data packet includes a packet extension field at an end of the data packet;
in response to determining that the data packet is transmitted using the particular MCS, setting a processing speed of an equalizer device of the first communication device to a speed that is less than a maximum processing speed of the equalizer device to prevent a buffer from overflowing, wherein the buffer receives outputs generated by the equalizer device;
processing, by a forward error correction code decoder device, outputs of the equalizer device corresponding to the data packet to generate decoded information corresponding to the data packet, wherein at least a subset of the outputs of the equalizer device are processed during the packet extension field; and
transmitting, by the communication device, an acknowledgment packet to acknowledge the data packet, wherein transmission of the acknowledgment packet begins within a required time period after an end of reception of the data packet, wherein the required time period is defined by a communication protocol.

12. The method of claim 11, wherein:
the equalizer device is a matrix equalizer device; and
the outputs of the matrix equalizer device corresponding to the first data packet include log likelihood ratio (LLR) values corresponding to data in the first packet.

13. The method of claim 12, wherein:
the error correction code decoder device is a low density parity check (LDPC) decoder device; and
processing outputs of the equalizer device comprises performing, by the LDPC decoder device, LDPC decoding using the LLR values.

14. The method of claim 11, wherein:
the information includes an indication of a duration of the packet extension field corresponding to the particular MCS.

15. The method of claim 11, wherein:
the information includes an indication of a minimum duration of the packet extension field to be included by in the data packet.

16. An apparatus, comprising:
a network interface device associated with a first communication device, wherein the network interface device includes one or more integrated circuits (ICs) configured to:
   transmit information to a second communication device informing the second communication device that packets intended for the first communication device and that use a particular modulation and coding scheme (MCS) must include a packet extension field,
   receive a data packet from the second communication device, wherein the data packet is transmitted using the particular MCS, and wherein data packet includes a packet extension field at an end of the data packet, in response to determining that the data packet is transmitted using the particular MCS, set a processing speed of an equalizer device of the first communication device to a speed that is less than a maximum processing speed of the equalizer device to prevent a buffer from overflowing, wherein the buffer receives outputs generated by the equalizer device, process, using a forward error correction code decoder device, outputs of the equalizer device corresponding to the data packet to generate decoded information corresponding to the data packet, wherein at least a subset of the outputs of the equalizer device are processed during the packet extension field, and transmit an acknowledgment packet to acknowledge the data packet, wherein transmission of the acknowledgment packet begins within a required time period after an end of the data packet, wherein the required time period is defined by a communication protocol.

17. The apparatus of claim 16, wherein:
the equalizer device is a matrix equalizer device; and
the outputs of the matrix equalizer device corresponding to the first data packet include log likelihood ratio (LLR) values corresponding to data in the first packet.

18. The apparatus of claim 17, wherein:
the forward error correction code decoder device is a low density parity check (LDPC) decoder device; and
the LDPC decoder device is configured to perform LDPC decoding using the LLR values.

19. The apparatus of claim 16, wherein:
the information includes an indication of a duration of the packet extension field corresponding to the particular MCS.

20. The apparatus of claim 16, wherein:
the first communication device signals an indication of a minimum duration of a packet extension field to be included in the data packet.

* * * * *